United States Patent [19]

Barnetche

[11] 4,290,497

[45] Sep. 22, 1981

[54] AUTOMATIC WEAR COMPENSATING SEAL DEVICE

[76] Inventor: Eduardo Barnetche, Ave. Universidad Num. 482, Mexico City 13, Mexico

[21] Appl. No.: 60,055

[22] Filed: Jul. 24, 1979

[51] Int. Cl.³ .................. E21B 10/08; F16J 15/34; F16J 15/54

[52] U.S. Cl. .................. 175/371; 277/83; 277/84; 277/92; 277/152

[58] Field of Search .................. 175/371; 277/83, 84, 277/91, 92, 152

[56] References Cited

U.S. PATENT DOCUMENTS

| | | | |
|---|---|---|---|
| 2,231,690 | 2/1941 | Sheldrick et al. | 277/84 |
| 2,714,025 | 7/1955 | Heinrich | 277/84 |
| 2,747,903 | 5/1956 | Heinrich | 277/84 X |
| 2,872,217 | 2/1959 | May | 277/83 X |
| 2,894,769 | 7/1959 | Richmond et al. | 277/83 X |
| 3,044,787 | 7/1962 | Derman | 277/83 |
| 3,109,661 | 11/1963 | Swaim et al. | 277/84 UX |
| 3,299,973 | 1/1967 | Swart et al. | 175/371 |
| 3,469,851 | 9/1969 | Enemark | 277/91 X |
| 3,663,073 | 5/1972 | Bronson | 277/83 X |
| 3,862,762 | 1/1975 | Millsap | 277/92 |

Primary Examiner—Stephen J. Novosad
Attorney, Agent, or Firm—Armstrong, Nikaido, Marmelstein & Kubovcik

[57] ABSTRACT

An automatic wear compensating seal device is provided for forming a seal between first and second members. An elastic sealing member is positioned between the first and second members such as that the elastic force of the sealing member holds the sealing member against at least one of the first and second members. An inclined surface is provided on the first member, the surface being inclined at acute angle with respect to the plane of sealing member. The inner peripheral surface of the sealing member contacts the first member on the inclined surface thereof to form a seal therebetween and the reaction force caused by the elastic force of the sealing member on the inclined surface holds the sealing member in contact with the second member to form a seal therebetween. Further a rotary drill bit is provided which includes the improvement of an automatic compensating seal device.

34 Claims, 16 Drawing Figures

AUTOMATIC WEAR COMPENSATING SEAL DEVICE

BACKGROUND OF THE INVENTION

1. Field of the Invention

The present invention is directed to an axial seal device and to an improvement in a rotary drill using an axial seal device and, more particularly, to an automatic wear compensating axial seal device which incorporates an elastic sealing member and an inclined surface on at least one of the members being sealed wherein the inclined surface and the elasticity of the sealing member combine to provide the wear compensation. Furthermore, the present invention is more particularly directed to a rotary drill bit which incorporates the improvement of this type of automatic wear compensating seal device.

2. Description of the Prior Art

In prior art devices where it is necessary to provide a seal between two elements which move relative to one another, the most common types of seals are annular seals such as those shown in U.S. Pat. No. 4,154,312 which is directed to a Barnetche drill bit, which is a rotary drill bit having a solid conical cutting head. The annular seal used in this reference are typical in that the annular sealing members are placed in grooves formed in one of the two members which are being sealed. The diameter of the annular sealing member is selected to be equal to the diameter of the groove so that the annular sealing member is not under any elastic force. The seal is formed by the peripheral surface of the annular sealing member which contacts the first member in the groove and the second member on the surface thereof. As a result of wear, the cross-sectional diameter of the seal will decrease, and eventually, the peripheral surface of the seal will not contact both the surface of the groove and the surface of the other element. At this point, the seal will lose its sealing effect.

Once the seal has lost its sealing effect then harmful elements in the environment, in which the sealed device is operating, can enter the interior of the device causing damage to other parts of the device. In a device such as the rotary drill bit shown in U.S. Pat. No. 4,154,312, the portion of the drill bit which wears first is the seals. In order to replace the seals, it is necessary to withdraw the drill bit from a bore hole, remove the cutting head, add new seals, replace the cutting head and then place the drill bit down the bore hole again. This is a time consuming task and, therefore, the change of the seals is a costly operation as a result of the lost time. Furthermore, failure to change the seals can cause serious damage to the internal elements of the drill bit.

Another type of prior art seal is a helical spring or bellows seal. This type of seal provides wear compensation since the sealing surfaces are perpendicular to the axis of the helical spring or bellow and the helical spring or bellow are compressed in order to bias the seal surfaces together and it also provides a large sealing surface. Although this type of seal is effective since it provides compensation for wear, the sealing devices are complicated and costly and further they require a relatively large amount of space. Space becomes a significant factor when the surfaces being sealed are used in a very small place such as a bore hole for a drill.

SUMMARY OF THE INVENTION

It is the primary object of the present invention to provide a seal device which provides automatic wear compensation.

It is another object of the present invention to provide a wear compensating seal device which permits uni-directional flow therethrough.

It is another object of the present invention to provide a seal device which has a large sealing surface but which requires less space and is less expensive than prior art large surface area seals.

It is another object of the present invention to provide an automatic wear compensating seal device wherein an annular elastic sealing member contacts an inclined surface such that the reaction force components of the inclined plane against the elastic force of the seal holds the seal in contact with the surfaces being sealed.

It is still another object of the present invention to provide an automatic wear compensating seal device wherein the elastic force of the sealing member holds the sealing member in contact with the surfaces to be sealed even after the sealing member has been reduced in size as a result of wear.

It is still another object of the present invention to provide an automatic wear compensating seal device having an elastic annular seal member wherein the elastic force of the seal member decreases the diameter of the seal member as the peripheral surface thereof is worn away in order to maintain contact between the seal member and the surfaces to be sealed.

It is still another object of the present invention to provide inserts of particular materials at the point at which a seal is formed in order to enhance the seal characteristics in relation to the particular parts which are being sealed.

It is still a further object of the present invention to provide a lip to maintain an annular elastic seal in place during the assembly of a structure to be sealed.

It is still a further object of the present invention to provide an automatic wear compensating seal device which includes an elastic element in combination with a non-elastic seal element to form a seal with another surface.

It is still a further object of the present invention to provide multiple automatic wear compensating seal devices for sealing two surfaces.

It is still a further object of the present invention to incorporate all of the above objects as improvements in a rotary drill bit.

The present invention is directed to an axial, wear compensating seal device for forming a seal between two members which rotate relative to one another. The seal device comprises an annular elastic sealing member which is positioned between the members to be sealed such that the elastic force of the sealing member holds the seal against at least one of the sealing members. An inclined surface is provided on one of the sealing members which is inclined at an acute angle with respect to the plane of the annular sealing member and the inner peripheral surface of the sealing member contacts the first member on the inclined surface thereof to form a seal therebetween. The reaction force to the elastic force of the sealing member on the inclined surface holds the sealing member in contact with the second member to form a seal therebetween. Further, the elastic force of the annular sealing member is radially inward and, therefore, the sealing member will hold itself against the inclined surface. As the seal is worn down, as a result of the relative movement between the members being sealed, the elastic force continues to pull the seal radially inward holding it against the inclined surface. Thus, the seal is wear compensating.

It is another feature of the present invention to make the inclined surface rougher than the other surface which the seal contacts. This will cause the sealing member to rotate perpendicular to its plane and thereby provide uniform wear around the peripheral surface of the sealing member.

It is still another feature of the present invention to provide a lip for engaging the sealing member in order to retain the sealing member against the inclined plane. This feature enables the elastic sealing member to be held on the inclined surface during assembly.

A further feature of the present invention is the use of inserts of particular materials in the surfaces which are to be sealed. The materials of the inserts are different than that of the member to be sealed and the inserts are selected for the particular properties with respect to sealing. In other words, an insert may be selected which can withstand high heat or a particularly aggressive environment or which has low friction, etc. The particular inserts selected will depend upon the particular device being used and the environment in which the device is being used.

Still a further feature of the present invention is to form the sealing member from a more than one annular member, one of which is elastic and one of which is chosen for its sealing characteristics relative to the other member being sealed. This feature also provides for the formation of a large sealing surface within a relatively small space.

Still a further feature of the present invention is to incorporate the above-described features as improvements in a rotary drill such as, for example, a Barnetche bit which has a solid conical cutting head.

DETAILED DESCRIPTION OF THE PREFERRED EMBODIMENTS

Figure 1A:
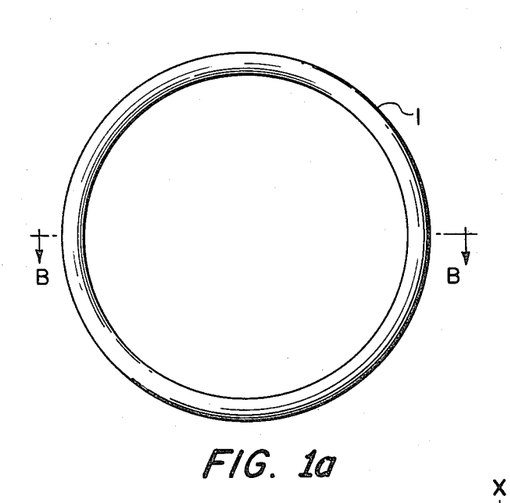
FIG. 1a is a plan view of an elastic annular sealing member of the present invention and FIG. 1b is a vertical section through section B—B thereof.
Figure 1B:
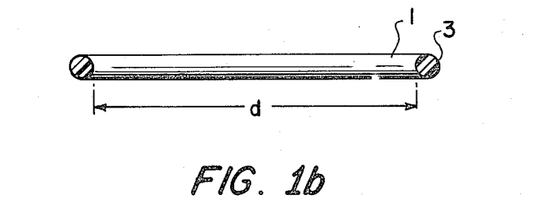

FIGS. 1a and 1b illustrate an annular sealing member 1 which is used in the present invention. The sealing member has a circular cross-section 3, however, various types of cross sectional shapes may be used. The elastic material used to form the annular sealing member 1 will be selected depending upon the environment and conditions in which the sealing member must function. In other words, the particular material selected will depend upon, for example, size, speed of rotation of the elements with which the seal is formed, the materials of the elements with which the sealing is used, the elements in the environment in which the device being sealed is used, the elements in the environment in which the device being sealed is used, the pressures to which the sealing member is subjected, etc.

Figure 2:
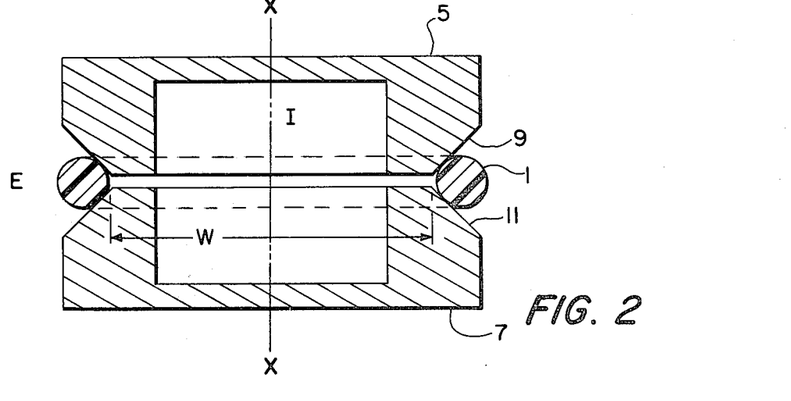
FIG. 2 is a cross-sectional view of a sealing device of a preferred embodiment of the present invention.

Referring to FIG. 2, the sealing member 1 is positioned between two members 5 and 7. The members 5 and 7 have hollowed out central portions which form an interior volume or space I which is to be sealed from an external environment E. The members 5 and 7 each have inclined planar surfaces 9 and 11 and the sealing member 1 is fitted against these inclined surfaces. The normal diameter d of the sealing member 1 is less than the width w of the surface being sealed and therefore, sealing member 1 has a radially inward elastic force which pulls it toward and holds it against inclined surface 9 and 11.

Figure 3:
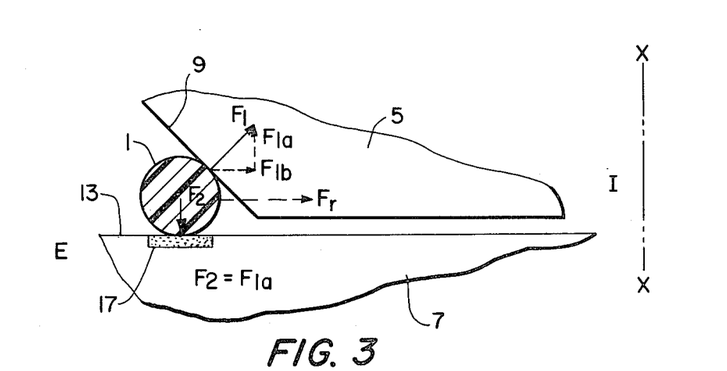
FIG. 3 is a partial sectional view of an alternate embodiment of the present invention.

In FIG. 2, inclined surfaces 9 and 11 are inclined at the same angle with respect to the plane of the annular sealing member 1, however, these surfaces can be inclined at different angles and in some instances, one of the surfaces 9 or 11 can be parallel to or coincide with the plane of the annular sealing member 1 as is shown, for example, in FIG. 3.

Referring to FIG. 3, annular sealing member 1 has been stretched and positioned between inclined surface 9 of a first member 5 and surface 13 of a second member 7 to form a seal between members 5 and 7 which rotate relative to one another about an axis X—X. The force of elasticity of the sealing member 1 is Fr and is in the radial inward direction. This force produces a force F1 at the point of contact between the sealing member 1 and the inclined surface 9. The force F1 can be broken down into orthogonal components F1a and F1b. The component F1b holds the sealing member 1 against the inclined plane 9 thereby ensuring a good seal at the point of contact. Furthermore, the force F1a produces a reaction force by the inclined plane on the annular sealing member which is equal in magnitude and opposite in direction, this force F2 applied at the point of contact between the sealing member and the surface 13. Thus, it can be seen that the force of elasticity of the sealing member produces forces which holds the sealing member in contact with both of the surfaces to be sealed. Furthermore, as the sealing member 1 is reduced in size as a result of wear, its elastic force will still include the force components shown although the points of contact will change by moving to the right in FIG. 3. However, even though the points of contact are moving to the right, the forces still maintain and hold the sealing member against the surfaces to be sealed.

Another very important feature of the present invention is the uni-directional flow characteristics of the sealing device. If the pressure in the environment E is greater than the pressure in the internal space I, then fluid in the external environment E will tend to flow towards the internal space I. However, as this fluid contacts the sealing member 1, it will push the sealing member 1 to the right as shown in FIG. 3, thereby increasing the force of the sealing member 1 against the inclined plane. This will first increase the force F1$b$ thereby enhancing the sealing effect against the inclined surface 9, and in addition, the pushing of the seal against the inclined surface 9 will increase the force F1$a$ and thereby the reaction force of the inclined surface against the sealing member which will in turn increase the force F2 thereby enhancing the seal of the sealing member 1 against surface 13. Thus, as the pressure in the environment E increases with respect to the pressure I in the interior, this will result in a greater sealing effect, thereby preventing any flow around the sealing member 1.

If on the other hand the pressure in the interior I is greater than the environmental or external pressure E, this will cause a flow of a lubricant, for example, in the internal volume or space ,I through space 15 towards the exterior E. As the lubricant contacts the sealing member 1, if the pressure differential is great enough to create a force sufficient to overcome the force of elasticity, the sealing member 1 will be pushed away from the inclined plane 9 and lubricant will flow through the small space which is formed. In addition, the force F2 will become zero allowing the lubricant to flow between the surface 13 and the sealing member 1. This arrangement, therefore, produces a uni-directional flow, self-lubricating seal which permits flow in only a single direction.

If desired, an insert can be placed in a contact surface at the point of contact with the sealing member 1. In FIG. 3, an insert 17 of a material different than the material of member 7 is inserted at the point in surface 13 where contact is made with the sealing member 1. The material of sealing member 17 would also in general be different than the material of member 5. By providing for the selection of different materials for the contact surfaces, it allows the materials of the contact surfaces to be selected in accordance with the function which the surface is performing. For example, if surface 13 is a sliding face, then the material chosen for insert 17 would be a low-friction long wearing material. Since 5 is not moving, the sealing member 1 is stationary with respect thereto and thus, the choice of material is not nearly as critical.

Figure 4:
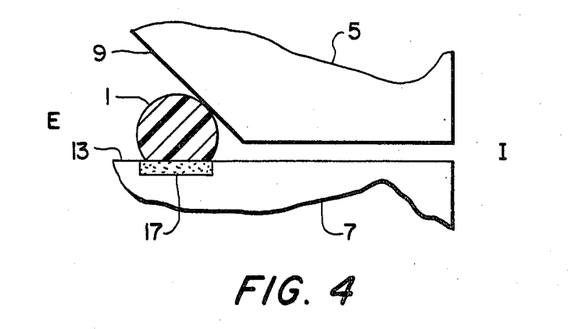
FIG. 4 is a partial sectional view illustrating wear characteristics of an annular seal.
Figure 5A:
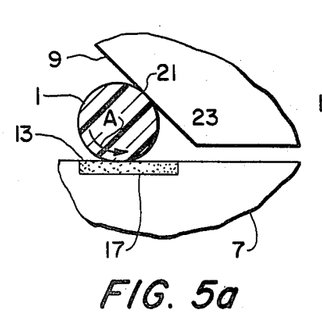
FIGS. 5a, 5b and 5c illustrate the wear of an annular sealing member of the present invention.
Figure 5B:
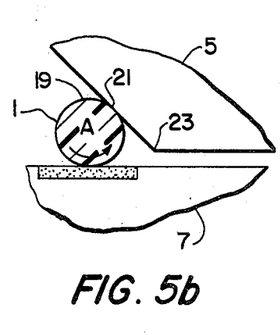
Figure 5C:
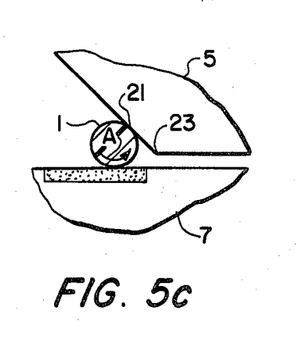

Referring to FIGS. 4 and 5, in FIG. 4, if the member 7 is rotated and the member 5 is held stationary, the seal member 1 will wear as illustrated. This type of wear is unsatisfactory since it results in heating of the seal which in turn results in an increased rate of wearing.

If, however, the inclined surface 9 is made rougher than the contact surface of insert 17, then as wear occurs, the annular sealing member 1 will rotate in the direction of arrow A, the point 19 on sealing member 1 will rotate as illustrated in FIGS. 5$a$, 5$b$ and 5$c$ as the seal wears and furthermore, the contact point 21 between the seal 1 and inclined surface 9 will move down the inclined surface and to the right towards point 23 as illustrated. Thus, even as the sealing member 1 wears, its wear on its periphery is uniform around its periphery and furthermore the elastic force maintains the seal contacts.

Figure 6A:
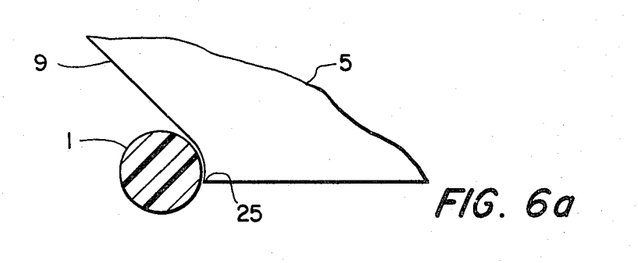
FIGS. 6a and 6b are partial sectional views illustrating a feature of the present invention.
Figure 6B:
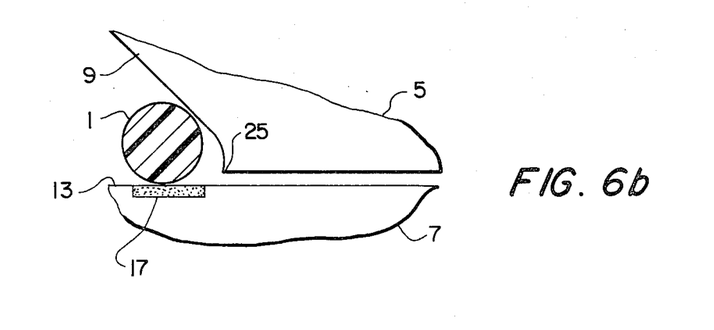

During the assembly of a device incorporating the seal of the present invention, it is necessary to hold the sealing member 1 under tension on the inclined surface 9 until the member 7 can be positioned. Referring to FIG. 6$a$, the inclined surface 9 is formed with a lip 25 which engages the sealing member 1 and holds it on the inclined surface 9 until the member 7 can be positioned as is illustrated in FIG. 6$b$.

Figures 7, 10:
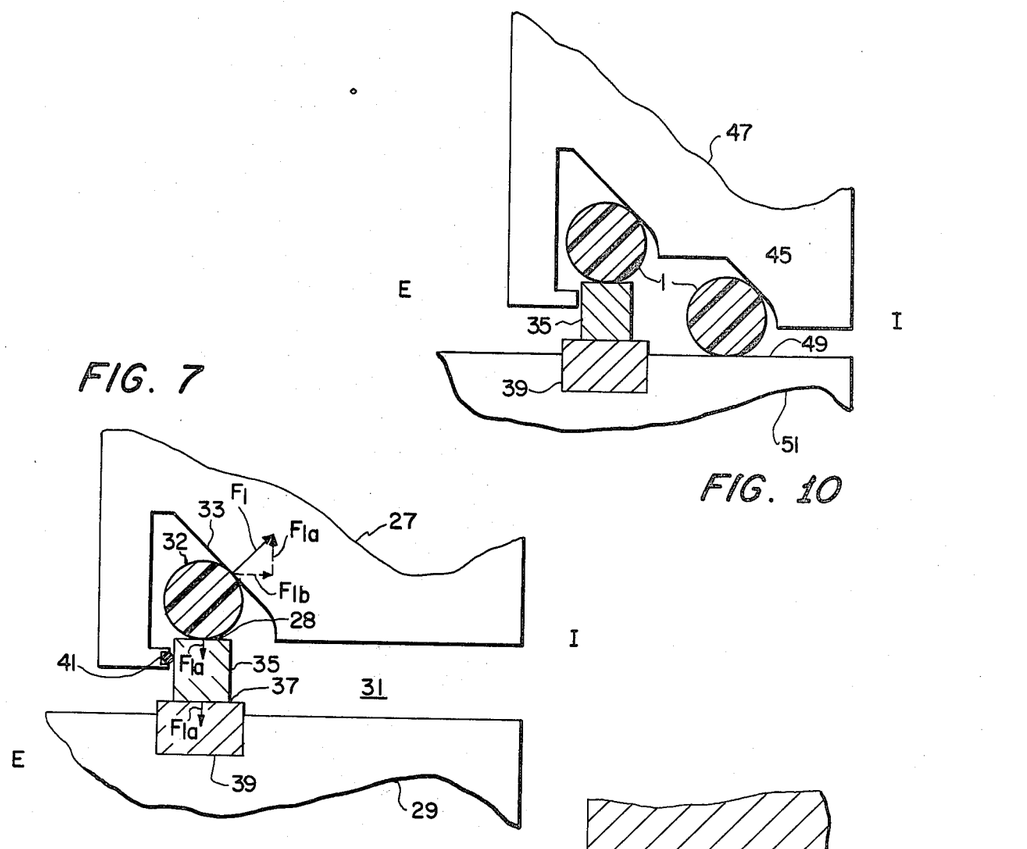
FIG. 7 is a partial sectional view illustrating another alternate embodiment of the present invention.
FIG. 10 is a partial sectional view illustrating still another alternate embodiment of the present invention.

In some applications, the formation of a seal between the moving seal face and the elastic annular sealing member itself becomes impractical. These situations may be, for example, where the wear of the elastic device will be too rapid or where a large sealing surface area is required for better isolation between an internal space I and an external environment E. Referring to FIG. 7, a seal is required between members 27 and 29 which are separated by a space 31. The seal seals an internal space or volume I from the external environment E. An annular elastic member 32 is provided between an inclined surface 33 and an annular sealing member 35. Sealing member 35 forms a seal along surface 37 with an insert 39 in member 29. The elastic member 32 may be an elastomer, a metal spring, or any other elastic device which has a radially inward elastic force which can be applied against the inclined surface. The elastic member 32 may or may not form a seal with the inclined surface. In this embodiment, a larger sealing surface area 37 is obtained between members 35 and 39 than the surface area 28 between members 32 and 35 and the second annular member 35 and the insert 39 can be chosen to have high work capability and/or low friction characteristics to meet the particular application. A retaining device or guide 41 is provided as part of member 27 in order to maintain annular member 35 in its correct position and an o-ring seal is used between guide 41 and annular member 35. An alternative guide 43 is shown in FIG. 8.

Figure 8:
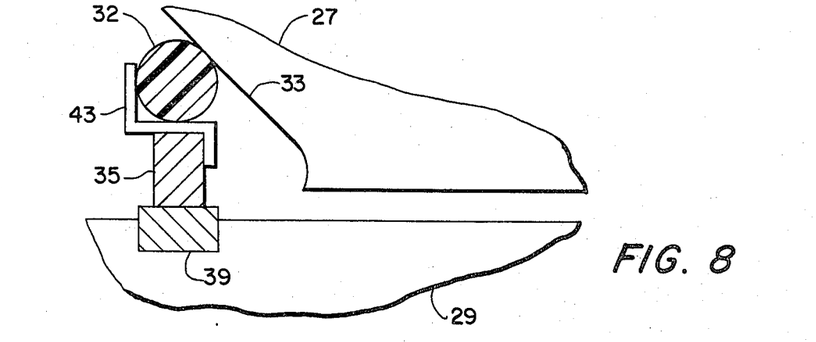
FIG. 8 is a partial sectional view illustrating still another alternative embodiment of the present invention.

In FIGS. 7 and 8, the elastic member 32 is held against inclined surface 33 by a force F1 produced by the elastic force of the elastic member. The inclined plane 33 produces a reaction force F1$a$ which holds the annular elastic member 32 against the second annular sealing member 35 and this force then holds the annular sealing member 35 against the insert 39 in member 29. The operation is, thus, the same as that described in the previous embodiments, except that the F1$a$ component is transmitted through the second annular sealing member 35 and elastic member 32 may not form a seal with the inclined surface 33 or the sealing member 35.

In sealing devices such as those shown in FIGS. 7 and 8, which use a first elastic sealing member and a second annular sealing member, the first and second sealing members may be fixed to each other to ensure there is no relative movement therebetween.

Figure 9:
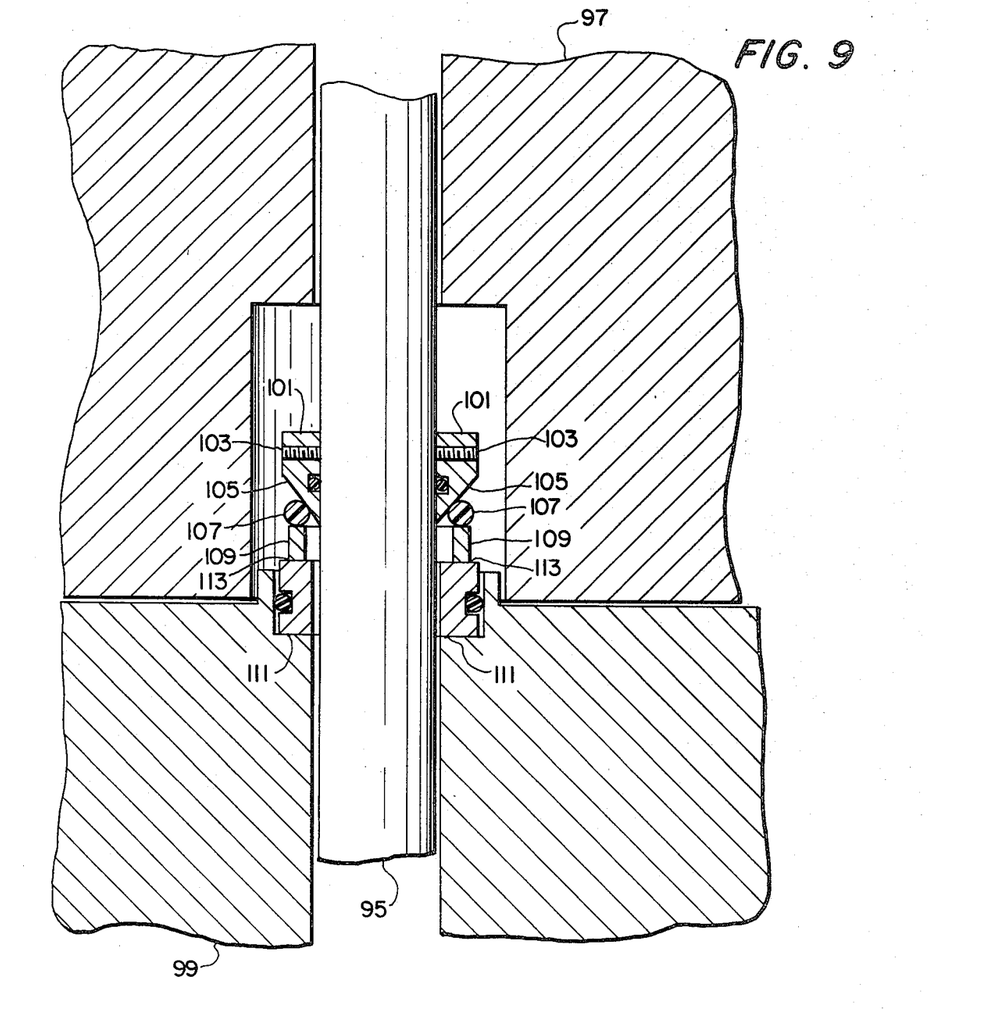
FIG. 9 is a partial sectional view illustrating a still further alternate embodiment of the present invention.

FIG. 9 illustrates another embodiment of the present invention for providing a seal for a rotating shaft, such as the shaft of a rotary pump. Rotating shaft 95 is rotatably positioned in a housing 97 the interior of which must be sealed from the exterior environment. The housing 97 could, for example, house the impeller blades of the pump. A face plate 99 is mounted on the pump housing 97. A first annular sealing member 101 is fixed on shaft 95 by set screws 103, the sealing member 101 having an inclined surface 105. A second elastic annular sealing member 107 contacts inclined surface 105 and a third annular sealing member 109 contacts the elastic sealing member 107. Insert 111 is inserted in face plate 99, the insert 111 and sealing member 109 forming a seal at 113. The seal is formed in the same manner as is described above with respect to FIG. 7.

In operation, when the shaft 95 rotates, sealing members 101, 107 and 109 rotate therewith, with no relative rotation therebetween. Insert 111 is stationary in face plate 99. Thus, when shaft 95 is rotated, relative movement occurs at seal face 113, sealing member 109 being held against insert 111 by the reaction force of elastic sealing member 107 against inclined surface 105. The material of sealing member 109 and insert 111 are selected, based upon the particular application, taking into consideration such factors as the kind of device with which the rotary shaft is used, speed of rotation, temperature, loads, environment, etc.

FIG. 10 illustrates an embodiment of the present invention which incorporates two wear compensating sealing devices.

The first sealing device includes an elastic annular sealing member 1 which contacts inclined surface 45 on a first member 47 and contacts surface 49 on member 51. The sealing effect is the same as that described above with regard to FIG. 3.

The second seal is formed by an annular elastic member 32, another annular sealing member 35 and an insert 39 in member 51. This second sealing device is the same as that described above with regard to FIG. 7.

By combining the two sealing devices as shown in FIG. 10, a composite seal is provided which has greater performance than each of the individual seal devices taken separately.

Figure 11:
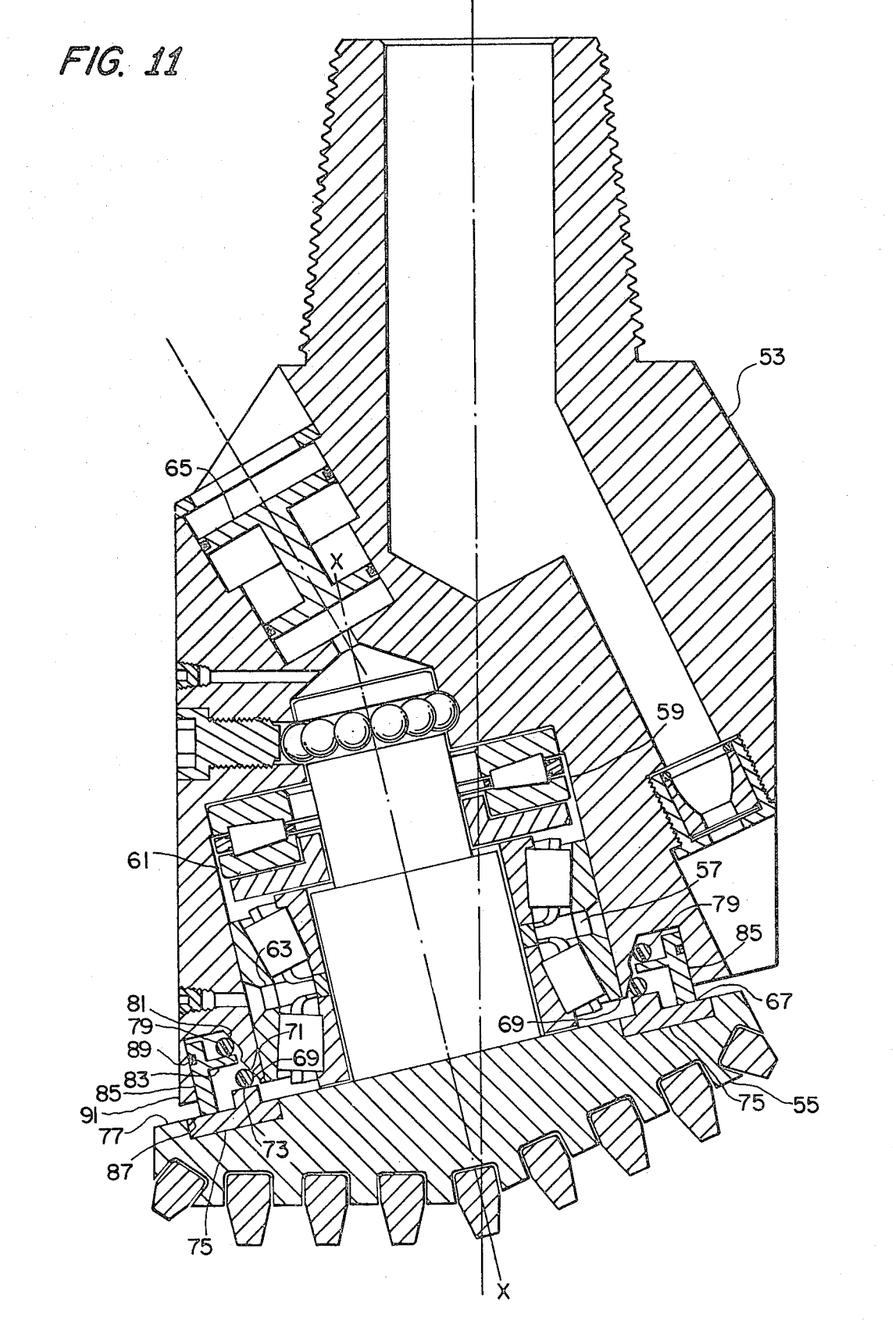
FIG. 11 is a sectional view of a rotary drill bit incorporating a wear compensating seal device of the present invention.

FIG. 11 illustrates a rotary drill bit which incorporates a wear compensating sealing device of the present invention. The rotary bit is of the type disclosed in U.S. Pat. No. 4,154,312, this patent being incorporated herein by reference. The upper housing portion 53 of the drill bit has a solid conical cutting head 55 rotatably mounted therein. The cutting head 55 is supported by bearings 57, 59, 61 and 63. Pressure compensation within the lubricating system for the bearings and conical head is provided by means of pressure compensator 65. The interior portion, volume or space within the upper portion 53 which receives the cutting head and bearing structure is sealed from the external environment by means of a sealing device generally indicated at 67. The sealing device includes an elastic annular sealing member 69 which is positioned against a first inclined surface 71 of the upper housing 53. The annular sealing member 69 also contacts the upper portion 73 of insert 75 which is inserted in the surface 77 of the cutting head 55. A second sealing device includes an annular elastic member 79 which contacts a second inclined surface 81 of the upper housing 53. The annular elastic member 79 contacts extension arm 83 of a non-elastic annular member 85 which in turn contacts surface 87 of the insert 75. An O-ring seal 89 is provided between annular member 85 and guide portion 91 of the upper housing member 53.

Pressure compensator 65 can, for example, be of the type shown and described in my co-pending application Ser. No. 60,056 filed concurrently herewith, now U.S. Pat. No. 4,254,838. This type of pressure compensator will produce a greater pressure in the interior or receiving means of the upper housing 53 than the pressure from the exterior of the drill bit. This will cause the lubricant within the interior space I which lubricates the bearings to flow in a direction around the seal towards the exterior of the drill bit, thus lubricating the seal devices and thereby enhancing their useful life. However, if the pressure on the exterior of the drill bit should for any reason become greater than that in the interior, the harmful elements in the environment cannot enter the interior of the drill bit since flow around the seals is unidirection as has been discussed above.

As the annular sealing member 69 wears as a result of usage, the point of contact with inclined surface 71 will move downward along the inclined surface and the contact of the sealing member with the sealing surface will be maintained.

The automatic lubrication of the sealing member and the automatic compensation for wear of the sealing member will greatly enhance the useful life of the sealing members. In a rotary drill bit such as that shown in FIG. 11, the element with the shortest life are the sealing members and, therefore, the improvement of the present invention significantly lengthens the operational cycle of the drill bit by lengthening the useful life of the weakest element in the drill bit. This, of course, results in substantial savings in time and money by eliminating the necessity for shutting down a well, withdrawing the drill bit, changing the seals and reinserting the drill bit as is frequently required in the prior art.

Figure 12:
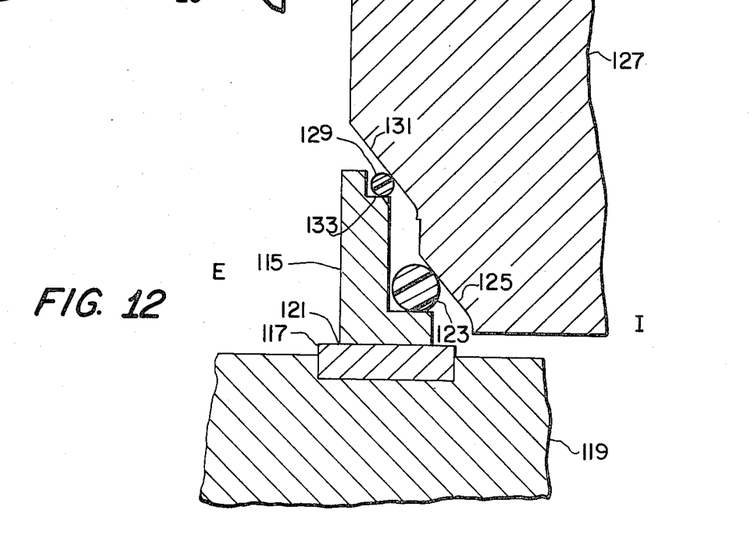
FIG. 12 is a partial sectional view illustrating still another alternative embodiment of the present invention.

FIG. 12 illustrates an embodiment of the present invention where the sealing device comprises an annular sealing member 115 which is held against insert 117 in member 119 to form a sealing surface at 121. Sealing member 115 is a hard non-elastic material. Sealing member 115 is held against the insert 117 by the reaction force of elastic member 123 against inclined surface 125 of member 127. The elastic member 123 is a non-sealing member and may be for example an annular helical spring or similar device having a large elastic force. Annular elastic sealing member 129 is positioned between sealing member 115 and inclined surface 131, and may be for example an elastomer which forms a seal with inclined surface 131 and surface 133 of sealing member 115. The sealing members 129 and 115 will present elements in the environment E from entering the interior space I between members 119 and 127, with the relative movement between members 127 and 119 being at sealing surface 121.

The embodiment of FIG. 12 can, for example, be used in the drill bit of FIG. 11 by substituting the seal device for seal device 67 with member 127 corresponding to upper housing 53 and member 119 corresponding to cutting head 55. If the embodiment of FIG. 12 is substituted for seal device 67, the O-ring 89 and guide member 86 can be eliminated because sealing member 129 provides the required sealing.

What is claimed is:

1. An axial seal device for forming a seal between first and second members, said seal device comprising:
   (a) an elastic sealing means positioned between said first and second members such that the elastic force of said sealing means holds said sealing means against at least one of said first and second members; and
   (b) an inclined surface on said first member, said surface being inclined at an acute angle with respect to the plane of said sealing means, wherein the inner peripheral surface of said sealing means contacts said first member on the inclined surface thereof to form a seal therebetween and wherein the reaction force to the elastic force of said sealing means on said inclined surface holds said sealing means in contact with said second member to form a seal therebetween and wherein the inclined surface of said first member is rougher than the portion of the surface of said second member which contacts said sealing means.

2. An axial seal device as set forth in claim 1 wherein said sealing means comprises a continuous elastic first annular member.

3. An axial seal device as set forth in claim 2 wherein said second member includes an inclined surface thereon, said surface being inclined with respect to the plane of said sealing means and wherein said sealing means contacts said second member on the inclined surface thereof and the elastic force of said sealing means holds said sealing means against said second member.

4. An axial seal device as set forth in claim 2 wherein said inclined surface includes a lip means for engaging said sealing means and thereby retaining said sealing means on said first member.

5. An axial seal device as set forth in claim 1 wherein said second member includes a surface parallel to the plane of said sealing means wherein said sealing means contacts said second member on the parallel surface thereof.

6. An automatic wear compensating seal device comprising:
(a) a first member having a first surface and inclined second and third surfaces inclined at an obtuse angle with respect to the plane of said first surface;
(b) a second member having a fourth surface wherein said first and second members are positioned with respect to one another along an axis perpendicular to the plane of said first surface;
(c) a first elastic sealing means comprising a first annular elastic means and a first annular sealing member, said first annular elastic means contacting said inclined second surface and said first annular sealing member, and said first annular sealing member contacting said fourth surface for forming a seal therebetween, wherein the reaction force of said inclined second surface on said annular elastic means is applied to said annular sealing member in a direction parallel to said axis and towards said fourth surface; and
(d) a second elastic sealing means contacting said third inclined surface such that the elastic force of said second sealing means has a third component perpendicular to said axis for maintaining said second sealing means in contact with said inclined third surface and a fourth component parallel to said axis for maintaining said second sealing means in contact with said fourth surface.

7. An automatic wear compensating seal device as set forth in claim 6 wherein said first annular elastic means forms a seal with said inclined second surface.

8. An automatic wear compensating seal device as set forth in claim 6 wherein said second sealing means comprises second annular elastic means and a second annular sealing member, said second annular elastic means contacting said inclined third surface and said second annular sealing member, and said second annular sealing member contacting said fourth surface for forming a seal therebetween, wherein the reaction force of said inclined third surface on said second annular sealing member in a direction parallel to said axis and towards said fourth surface.

9. An automatic wear compensating seal device as set forth in claim 8 wherein said second annular elastic means forms a seal with said third inclined surface.

10. An automatic wear compensating seal device as set forth in claim 8 wherein said first sealing means comprises a third annular member contacting said inclined second surface and said third surface.

11. An automatic wear compensating seal device as set forth in claim 8 wherein said second annular sealing member comprises a contacting portion contacting said fourth surface and an extension portion extending from said contacting portion said second annular elastic means contacting said extension portion and exerting a force thereon in a direction parallel to said axis, thereby holding said contacting portion against said fourth surface.

12. An automatic wear compensating seal device as set forth in claim 11 wherein said first sealing means comprises a third annular sealing member contacting said inclined second surface and said fourth surface.

13. An automatic wear compensating seal device as set forth in claim 8 including guide means for maintaining the distance from said axis of said second annular sealing member, such that said second annular sealing member remains in contact with said fifth surface.

14. A rotary drill as set forth in claim 8 including guide means for maintaining the distance from said axis of said second annular sealing member, such that said second annular sealing member remains in contact with said fifth surface.

15. An automatic wear compensating seal device as set forth in claim 6 wherein said second member includes an insert means forming said fourth surface wherein said insert means and said second member are composed of different materials.

16. An automatic wear compensating seal device as set forth in claim 12 or 8 wherein said second member includes insert means said insert means forming at least a portion of said fourth surface wherein said insert means and said second member are composed of different materials.

17. An automatic wear compensating seal device as set forth in claim 6 wherein said fourth surface includes first and second portions and wherein said first and second portions are parallel and in different planes.

18. An automatic wear compensating seal device as set forth in any of claims 6, 7, 8, 9-15 or 17 wherein at least one of said second or third inclined surfaces is rougher than said fourth surface.

19. An automatic wear compensating seal device as set forth in any of claims 6, 7, 8, 9-15 or 17 wherein at least one of said second and third inclined surfaces includes lip means for maintaining said sealing means around said first member.

20. In a rotary drill for drilling a well in the surface of the earth, said drill comprising:
(a) a drill bit including an upper portion for connection to a drill string, duct means including a fluid outlet into the well for carrying fluid to extract detritus and clean the bottom of the well and receiving means;
(b) a solid cutting head comprising a conical head portion and a unitary stem portion with no internal passages therein, said conical head portion including holes therein and cutting elements inserted in said holes, said stem portion being received in said receiving means of said drill bit, wherein said stem and said receiving means include holding means for rotatably holding said cutting head in said drill bit;

(c) bearing means between said drill bit and said conical head, said bearing means being fixed relative to said drill bit and to said conical head for preventing movement between bearing surfaces of the bearing means which contact the drill bit and conical head on the drill bit and conical head, but allowing said conical head to rotate relative to said drill bit;

(d) a lubrication system, independent of said duct means, interconnected between said drill bit and said cutting head said lubricating system including a stabilizer means for equalizing the pressure in the lubricating system with the pressure in the bore hole surrounding the bit; and (e) a seal device between said upper portion and said solid cutting head;

the improvement wherein said seal device is an automatic wear compensating seal device comprising:

(1) a first surface and an inclined second surface on said upper portion said inclined second surface being inclined at an obtuse angle with respect to the plane of said first surface;

(2) a third surface on said cutting head;

wherein said cutting head is positioned adjacent to said upper portion along an axis perpendicular to said first surface; and (3) a first elastic sealing means contacting said inclined second surface such that the elastic force of said first sealing means has a first component perpendicular to said axis for maintaining said first sealing means in contact with said inclined second surface and a second component parallel to said axis which causes a reaction force for maintaining said first sealing means in contact with said third surface.

21. A rotary drill as set forth in claim 20 wherein said first elastic sealing means comprises a first annular elastic means and a first annular sealing member, said first annular elastic means contacting said inclined second surface and said first annular sealing member, and said first annular sealing member contacting said third surface for forming a seal therebetween, wherein the reaction force of said inclined second surface on said annular elastic means is applied to said annular sealing member in a direction parallel to said axis and towards said third surface.

22. A rotary drill as set forth in claim 21 wherein said first annular elastic means forms a seal with said inclined second surface.

23. A rotary drill as set forth in claim 20 or 21 wherein said upper portion includes an inclined fourth surface and said cutting head includes a fifth surface said device including a second elastic sealing means contacting said inclined fourth surface such that the elastic force of said second sealing means has a third component perpendicular to said axis for maintaining said second sealing means in contact with said fifth surface.

24. A rotary drill as set forth in claim 23 wherein said second sealing means comprises second annular elastic means and a second annular sealing member, said second annular elastic means contacting said inclined fourth surface and said second annular sealing member, and said second annular sealing member contacting said fifth surface for forming a seal therebetween, wherein the reaction force of said inclined fourth surface on said second annular elastic means is applied to said second annular sealing member in a direction parallel to said axis and towards said fifth surface.

25. A rotary drill as set forth in claim 24 wherein said second annular elastic means forms a seal with said fourth inclined surface.

26. A rotary drill as set forth in claim 24 wherein said first sealing means comprises a third annular member contacting said inclined second surface and said third surface.

27. A rotary drill as set forth in claim 24 wherein said second annular sealing member comprises a contacting portion contacting said fifth surface and an extension portion extending from said contacting portion said second annular elastic means contacting said extension portion and exerting a force thereon in a direction parallel to said axis, thereby holding said contacting portion against said fifth surface.

28. A rotary drill as set forth in claim 27 wherein said first sealing means comprises a third annular sealing member contacting said inclined second surface and said third surface.

29. A rotary drill as set forth in claim 23 wherein said cutting head includes insert means said insert means forming at least one of said third and fifth surfaces wherein said insert means and said cutting head are composed of different materials.

30. A rotary drill as set forth in claim 23 wherein said third and fifth surfaces are parallel and in different planes.

31. A rotary drill as set forth in claim 23 wherein said third and fifth surfaces are in the same plane.

32. A rotary drill as set forth in claim 23 wherein at least one of said second or fourth inclined surfaces is rougher than at least one of said third or fifth surfaces.

33. A rotary drill as set forth in claim 23 wherein at least one of said second and fourth inclined surfaces includes lip means for maintaining said sealing means around said upper portion.

34. A rotary drill as set forth in claim 20 wherein said cutting head includes an insert means forming said third surface wherein said insert means and said cutting head are composed of different materials.

* * * * *